United States Patent
Bellovin

(10) Patent No.: US 7,051,365 B1
(45) Date of Patent: May 23, 2006

(54) METHOD AND APPARATUS FOR A DISTRIBUTED FIREWALL

(75) Inventor: Steven Michael Bellovin, Westfield, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/343,464

(22) Filed: Jun. 30, 1999

(51) Int. Cl.
*G06F 9/00* (2006.01)
*G06F 15/173* (2006.01)

(52) U.S. Cl. .................. 726/11; 709/225; 709/226
(58) Field of Classification Search ............ 713/160, 713/162, 153, 201; 709/225, 226
See application file for complete search history.

(56) References Cited

U.S. PATENT DOCUMENTS

| | | | | |
|---|---|---|---|---|
| 5,606,668 A | * | 2/1997 | Shwed | ............ 713/201 |
| 6,148,342 A | * | 11/2000 | Ho | ................ 709/225 |
| 6,304,973 B1 | * | 10/2001 | Williams | .......... 713/201 |
| 6,307,837 B1 | * | 10/2001 | Ichikawa et al. | ...... 370/230 |
| 6,507,908 B1 | * | 1/2003 | Caronni | .......... 709/225 |

* cited by examiner

*Primary Examiner*—Emmanuel L. Moise
*Assistant Examiner*—Courtney Fields

(57) ABSTRACT

A method and apparatus for a implementing a distributed firewall is described. A packet filter processor receives a packet sent from a first device to a second device. The packet filter processor authenticates an identifier for the packet. For example, authentication could be performed using a cryptographically-verifiable identifier. The packet filter processor determines whether to send the packet to the second device, based on the authentication and a set of policy rules. The packet filter processor sends the packet to the second device in accordance with the determination.

23 Claims, 3 Drawing Sheets

METHOD AND APPARATUS FOR A DISTRIBUTED FIREWALL

FIELD OF THE INVENTION

The invention relates to communications in general. More particularly, the invention relates to a method and apparatus for creating a distributed firewall using cryptographic techniques.

BACKGROUND OF THE INVENTION

Conventional firewalls rely on the notions of restricted topology and control entry points to function. More precisely, they rely on the assumption that everyone on one side of the firewall is to be trusted, while those on the other side are not. The vastly expanded Internet connectivity in recent years has called that assumption into question. So-called "extranets" can allow outsiders to reach the "inside" of the firewall. Conversely, telecommuters' machines that traditionally do not have the protection of a firewall use the Internet for connectivity. These machines in particular need protection when encrypted tunnels are not in place. Other trends are also threatening the traditional notion of firewalls. For example, some machines need more access to the outside than do others. Conventional firewalls are not suited to deal with these types of problems, especially as internally assigned Internet Protocol (IP) addresses change. End-to-end encryption is another threat, since the firewall generally does not have the necessary codes (or keys) to peer through the encryption.

In an attempt to solve some of these problems, the notion of a "distributed firewall" was created. Instead of having a single firewall existing at some controlled access point to the network, each network device would be equipped with its own firewall. A distributed firewall preserves central control of access policy, while reducing or eliminating any dependency on topology. In such a scheme, policy is still centrally defined. Enforcement of the policy, however, takes place on each endpoint. In this manner the advantages of conventional firewalls are maintained while avoiding most of the associated limitations, most notably the dependency on topology.

One example of a distributed firewall is described in U.S. Pat. No. 5,606,668 titled "System for Securing Inbound and Outbound Data Packet Flow in a Computer Network." The '668 patent discloses a distributed firewall wherein each network device is equipped with its own packet filter. A packet filter simply retrieves a source address from a packet, and compares it with a list of addresses. The packet is then passed or dropped based on the results of the comparison. The determination whether to pass or drop the packet is normally implemented as a set of rules, e.g., if the address is on the list drop the packet.

Conventional distributed firewalls, such as the one disclosed in the '668 patent, however, are less than satisfactory for a number of reasons. For example, the distributed firewall described in the '668 patent is not capable of preventing "spoofing." Spoofing refers to a technique wherein a packet sender attempts to access a firewall by impersonating another sender's address. For example, the filter module described in the '668 patent filters packets based on the source IP address embedded within the packet. A person could discover a source IP address with permission to access a secure site, and attempt to access the secure site by emulating the allowed source IP address. In other words, there is no technique for authenticating the identity of the sender. In another example, the '668 patent fails to address the telecommuting situation where a user often connects a computer to a corporate network via an unsecured link, e.g., the Internet. In such a case, there is no mechanism for protecting communications between the corporate network and the telecommuters' computer. Part of the problem with telecommuters is triangle routing, plus lack of protection for their machines when on the outside Internet.

From the foregoing, it can be appreciated that a substantial need exists for a distributed firewall that solves the aforementioned problems.

SUMMARY OF THE INVENTION

An embodiment of the invention comprises a method and apparatus for a implementing a distributed firewall. A packet filter processor receives a packet sent from a first device to a second device. The packet filter processor authenticates an identifier for the packet. For example, authentication could be performed using a cryptographically-verifiable identifier. The packet filter processor determines whether to send the packet to the second device, based on the authentication and a set of policy rules. The packet filter processor sends the packet to the second device in accordance with the determination.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
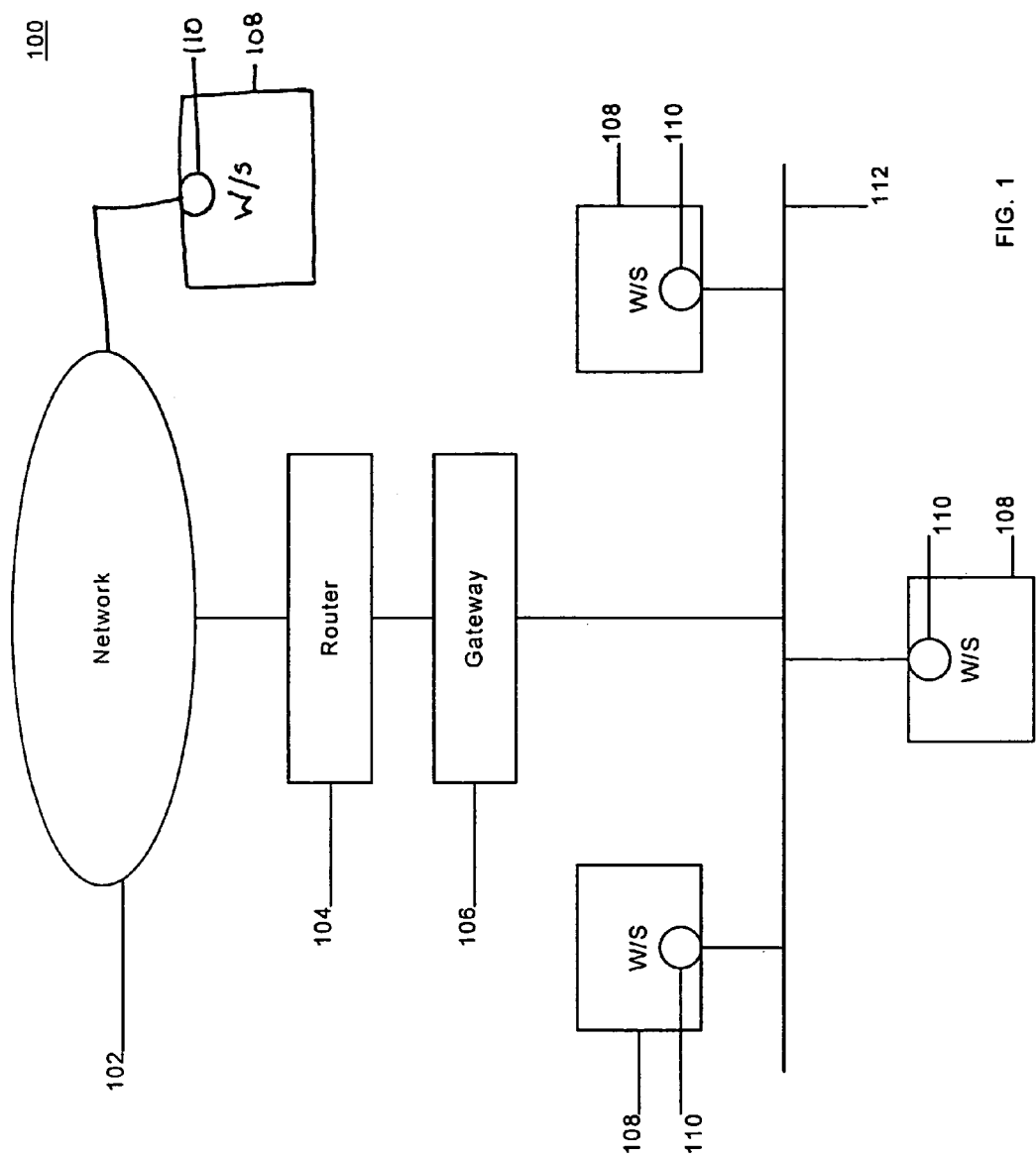
FIG. 1 illustrates a network topology suitable for practicing one embodiment of the invention.

The embodiments of the invention include a distributed firewall that utilizes the following principles: a) a policy language that states what sort of connections are permitted or prohibited, b) an encryption mechanism; and c) any of a number of system management tools, such as Microsoft's Systems Management Server (SMS) or Automatic Software Distribution (ASD) to manage the distributed firewall. ASD is described in a paper authored by Andrew Koenig entitled "Automatic Software Distribution," USENIX Conference Proceedings, Pages 312–322, Salt Lake City, Utah, Summer, 1984, and is incorporated by reference herein.

In one embodiment of the invention, a compiler translates the policy language into some internal format. The system management software distributes this policy file to all hosts that are protected by the firewall. Any incoming packets are accepted or rejected by each "inside" host, according to both the policy and the cryptographically-verified identity of each sender.

The embodiments of the invention, unlike conventional firewalls, incorporate an encryption mechanism used to authenticate the cryptographically-verified identity of each sender to add another layer of protection against unauthorized intrusions. Some conventional packet filters evaluate an incoming packet using a source designator such as an IP address (e.g., the source address). That is, a specified IP address may be fully trusted, able to receive incoming mail from the Internet, and so forth. Other conventional packet filters rely on topology to know the difference between "inside" and "outside", where packets from "outside" are only allowed to reach certain machines and services on the "inside". As stated above, however, the specified IP address may be duplicated by an unauthorized party or agent and used to gain access to a secure site. To avoid this problem, the embodiments of the invention utilize a name in a cryptographic certificate as the common host identifier. Certificates can be a very reliable unique identifier for many reasons. For example, they are independent of topology, and therefore the use of certificates removes the "inside" and "outside" distinction. Furthermore, ownership of a certificate is not easily spoofed. If a machine is granted certain privileges based on its certificate, those privileges can apply regardless of where the machine is located physically. In a different sense, policies can be "pulled" dynamically by the end system. For example, a license server or a security clearance server can be asked if a certain communication should be permitted.

The combination of a distributed firewall and cryptographically-verified identity authentication provides a superior form of protection over conventional firewalls for a number of reasons. As an initial matter, distributed firewalls in general offer many advantages over conventional firewalls. For example, a distributed firewall can be centrally managed. In a typical organizational environment, individuals are not necessarily the administrators of the computers they use. Instead, to simplify system administration and to permit some level of central control, a system management package is used to administer individual machines. Patches can be installed, new software distributed, and so forth. These same mechanisms are used to control a distributed firewall. Policy is enforced by each individual host that participates in a distributed firewall. The security administrator, who is no longer necessarily the "local" administrator, defines the security policy in terms of host identifiers. The resulting policy (compiled to some convenient internal format) is then shipped out, much like any other change. This policy file is consulted before processing incoming or outgoing messages, to verify their compliance. It is most natural to think of this happening at the network or transport layers, but policies and enforcement can equally well apply to the application layer, data link layer or physical layer, if desired. For example, some sites might wish to force local Web browsers to disable Java or Javascript.

Policy enforcement is especially useful if the peer host is identified by a certificate. If so, the local host has a much stronger assurance of its identity than in a traditional firewall. In the latter case, all hosts on the inside are in some sense equal. If any such machines are subverted, they can launch attacks on hosts that they would not normally talk to, possibly by impersonating trusted hosts for protocols such as "rlogin." With a distributed firewall, though, such spoofing is not possible since each host's identity is cryptographically assured. Consider the problem of electronic mail. Because of a long-standing history of security problems in mailers, most sites with firewalls let only a few, designated hosts receive mail from the outside. They in turn will relay the mail to internal mail servers. Traditional firewalls would express this by a rule that permitted Simple Mail Transfer Protocol (SMTP) (port 25) connections to the internal mail gateways; access to other internal hosts would be blocked. On the inside of the firewall, though, access to port 25 is unrestricted. With a distributed firewall, all machines have some rule concerning port 25. The mail gateway permits anyone to connect to that port. Other internal machines, however, permit contact only from the mail gateway, as identified by its certificate. This provides superior protection than conventional techniques. For example, even a subverted internal host cannot exploit possible mailer bugs on the protected machines.

Distributed firewalls have other advantages as well. The most obvious is that there is no longer a single choke point. From both a performance and availability stand-point, this is a major benefit. Throughput is no longer limited by the speed of the firewall. Similarly, there is no longer a single point of failure that can isolate an entire network. A second advantage is more subtle. Conventional firewalls do not have certain knowledge of what a host intends. Instead, they have to rely on externally-visible features of assorted protocols. Thus, an incoming TCP packet is sometimes presumed legitimate if it has the "ACK" bit set, since such a packet can only be legitimate if it is part of an ongoing conversation (e.g., a conversation whose initiation was presumably allowed by the firewall). But spoofed ACK packets can be used as part of "stealth scanning." Similarly, it is hard for firewalls to treat User Datagram Protocol (UDP) packets properly, because they cannot tell if they are replies to outbound queries, and hence legal, or if they are incoming attacks. The sending host, however, knows. Relying on the host to make the appropriate decision is therefore more secure. This advantage is even clearer when it comes to protocols such as the File Transfer Protocol (FTP). By default, FTP clients use the PORT command to specify the port number used for the data channel. This port is for an incoming call that should be permitted, an operation that is generally not permitted through a firewall. Conventional firewalls, even the stateful packet filters, generally use an application-level gateway to handle such commands. With a distributed firewall, the host itself knows when it is listening for a particular data connection, and can reject random probes. One particular advantage of distributed firewalls, however, is that distributed firewalls can protect hosts that are not within a topological boundary.

Consider a telecommuter who uses the Internet both generically and to tunnel in to a corporate net. A problem arises regarding how the telecommuter's computer should be protected. A conventional approach can protect the machine using conventional "tunneling" techniques, but that requires that generic Internet use be tunneled into the corporate network and then back out the Internet. Apart from efficiency considerations, such use is often in violation of corporate guidelines. Furthermore, there is no protection whatsoever when the tunnel is not set up. By contrast, a distributed firewall protects the machine all of the time, regardless of whether or not a tunnel is set up. Corporate packets, authenticated by an encryption mechanism, are granted more privileges, while packets from random Internet hosts can be rejected. This would also avoid the need for triangle routing.

The embodiments of the invention utilize a policy language that states what sort of connections are permitted or prohibited. Many possible policy languages can be used as long as the particular policy language is powerful enough to express the desired policy or rule set. In this embodiment of the invention, the general policy language provided by KeyNote is used. KeyNote is an especially attractive choice for a policy language due to its suitability for configuring packet filters. Its advantages include the integration of credentials with policy specification, and an ability to use a single mechanism to specify policy at different levels. KeyNote is described in a paper authored by M. Blaze, J. Feigenbaum and A. Keromytis, entilted "KeyNote: Trust Management for Public-Key Infrastructures," Springer, LNCS vol. 1550, Proceedings of the 1998 Cambridge Security Protocols International Workshop, 1999, pages 59–63, which is incorporated by reference herein.

The policy rules are designed by a trusted authority, such as a site administrator, and are stored in a policy configuration file. A sample policy configuration file is shown as follows:

{Start}
   inside_net=x509{name="*.example.com"};
   mail_gw=x509{name="mailgw.example.com"};
   time_server=IPv4{10.1.2.3};
   allow smtp(*, mail_gw);
   allow smtp(mail_gw, inside_net);
   allow ntp(time_server, inside_net);
   allow*(inside_net,*).
{End}

According to this sample policy configuration file, electronic mail from outside the distributed firewall can only reach the machine with a certificate identifying it as the mail gateway. The mail gateway then sends the received mail to all "inside" machines. The terms "inside" and "outside" as used herein refer to those devices or applications that are protected by the distributed firewall, and those devices or applications that are seeking entrance to the protected devices or applications, respectively. This sample policy configuration file also makes reference to the Network Time Protocol (NTP), which is a low-risk protocol that has its own application-level protection. Any NTP messages are allowed to be distributed from a given IP address to all inside machines. Finally, all outgoing calls from inside devices to outside devices are permitted.

In addition to the policy language and system management tools, the embodiments of the invention utilize an encryption mechanism to strengthen the security offered by conventional distributed firewalls. The encryption mechanism can be any cryptographic technique which is resistant to decoding by an untrusted party. In one embodiment of the invention, the encryption mechanism used is the one set forth in the Internet Engineering Task Force's Request For Comments 2401, entitled a "Security Architecture For The Internet Protocol", authored by S. Kent and R. Atkinson, November 1998 (IPSEC), which is incorporated by reference herein. IPSEC is a network-level encryption mechanism for the Transmission Control Protocol/Internet Protocol (TCP/IP). In accordance with IPSEC, each packet can be modified to include an Authentication Header (AH). The AH provides connectionless integrity, data origin authentication, and an optional anti-replay service. The AH is a vehicle for access control, based on the distribution of cryptographic keys and the management of traffic flows relative to these security protocols. The details and implementation of the AH is described in detail in IPSEC, and will not be further described herein.

The encryption mechanism can be used in a number of different ways to enhance the functionality provided by distributed firewalls. In one particularly advantageous embodiment, end-to-end IPSEC is used. Each incoming packet can be associated with a certificate. The access granted to that packet is determined by the rights granted to that certificate. Consider a packet destined for port 25 (SMTP) on an inside machine, given the sample policy configuration file described above. If the certificate identifies the source as "mailgw.example.com" (note that this is not necessarily the same as the machine with that domain name) the packet will be accepted. If the certificate name is different (for clarity, any discussion of the certificate's signature chain is omitted, although it is clearly important for real use), or if there is no IPSEC protection, the packet will be dropped as unauthorized. It is noted that the necessary filtering is prescribed by the IPSEC architecture. Specifically, the inbound Security Policy Database (SPD) is used to reject illegal input packets, while the outbound SPD can be used to control outgoing connections. Many commercial IPSEC implementations either support port number-granularity security associations or will in the near future. Application-level protection can be achieved by distributing application-specific policy files. Thus, web browsers can be told, by the central site, to reject, for example, all ActiveX controls or Java applets. This is a particularly difficult function for conventional firewalls. Doing it on the end hosts is more secure, if the policy distribution problem can be solved. One of the more difficult problems is handling protocols such as FTP without touching the application. This can be accomplished with per-process keying for IPSEC. For example, a policy rule for FTP would indicate that outbound connections to port 21 must be protected with IPSEC, and that all other TCP connections protected by that security association (SA) are legal. Since only that process can use that SA, and it would only have the FTP data channel open, an adequate level of protection can be achieved.

Given that access rights in a strong distributed firewall are tied to certificates, access rights can be limited by changing the set of certificates accepted. Suppose, for example, that a security flaw is discovered in some networked application. A new certificate can be distributed to hosts in the same distribution as the patch. Only hosts with newer certificates are then considered to be "inside." If the change is not installed, the machine will have fewer privileges. In some environments, it may even be possible to use certificates to help ensure user compliance. A "PolicyMaker" certificate could contain code that checks the configuration of the user's system. A PolicyMaker certificate is described in a paper authored by Matt Blaze et al. entitled "Decentralized Trust Management," IEEE Symposium on Security and Privacy, pages 164–173, 1996, and a paper authored by Matt Blaze et al. entitled "Compliance Checking In The PolicyMaker Trust Management System," Proceedings of the 2nd Financial Crypto Conference, 1998, both of which are incorporated by reference herein. If the check failed, that is, if the proper versions of the proper files were not present, the certificate would not allow itself to be used for authentication. Without tamper-resistant hardware this is not an absolute check, but it can help protect against accidental misconfiguration and less-determined malfeasance. The certificate version mechanism also protects against new, insecure machines that are installed on an inside network. Until the appropriate filtering software and rule sets are installed (and possibly until the machine is otherwise made secure by the organization's administrators), no certificate is issued. The machine is thus an outside machine, regardless of its physical location.

Referring now in detail to the drawings wherein like parts are designated by like reference numerals throughout, there is illustrated in FIG. 1 a network topology suitable for practicing one embodiment of the invention. As shown in FIG. 1, a router 104 is connected to a network 102. Router 104 is in turn connected to a gateway 106. Gateway 106 is connected to a local area network (LAN) 112 having one or more work stations (W/S) 108. Each workstation 108 is connected to LAN 112 by a packet filter processor 110. A workstation can be any type of network device, such as a personal computer, network server, laptop computer, personal digital assistant (PDA), and so forth. Furthermore, the workstation can be connected directly to LAN 112, or indirectly via network 102. In addition, any one of the workstations can be used as a central site administrator. This workstation would be configured with the appropriate policy language and system management software/hardware (collectively referred to as a "system management module") to manage each packet filter processor 110 in accordance with the principles described herein.

In this embodiment of the invention a dedicated packet filter processor is used to help enhance the speed and throughput of the packet filter. By adding additional overhead to each packet in the form of an IPSEC authentication header, encrypting the entire packet itself, or a combination of both, the processing of packets by the packet filter becomes incrementally more burdensome. Therefore, it is useful to have a dedicated packet filter to offset the increased processing requirements. Although this embodiment of the invention use dedicated packet filter processors for the distributed firewall, however, software based filter modules could also be used and still fall within the scope of the invention. An example of such software based filter modules is described in the '668 patent, modified to reflect the principles detailed herein. Further, packet filter processor 110 can be placed anywhere in the network such as, for example, gateway 106, router 104 or a network device connecting from outside the network via the Internet, or in any other strategic point inside or outside the network, and still fall within the scope of the invention. Finally, it can be appreciated that the particular configuration shown in FIG. 1 is chosen as an example only and is not limitive of the type of network on which the embodiments of the present invention can work. The number of configurations that networks can take are virtually limitless and techniques for setting up those configurations are well known to those skilled in the art. The embodiments of the invention can operate on any of these possible configurations.

In the embodiments of the invention, network 102 and LAN 112 are packet based networks, such as Transmission Control Protocol/Internet Protocol (TCP/IP) networks or X.25 networks. A packet originates from network 102 or LAN 112 with an intended destination to workstation 108. Both the source and destination addresses are included in the packet, as well a cryptographically-verifiable identifier for the host or sending device. In one embodiment of the invention, the cryptographically-verifiable identifier is part of an AH in accordance with IPSEC.

Figure 2:
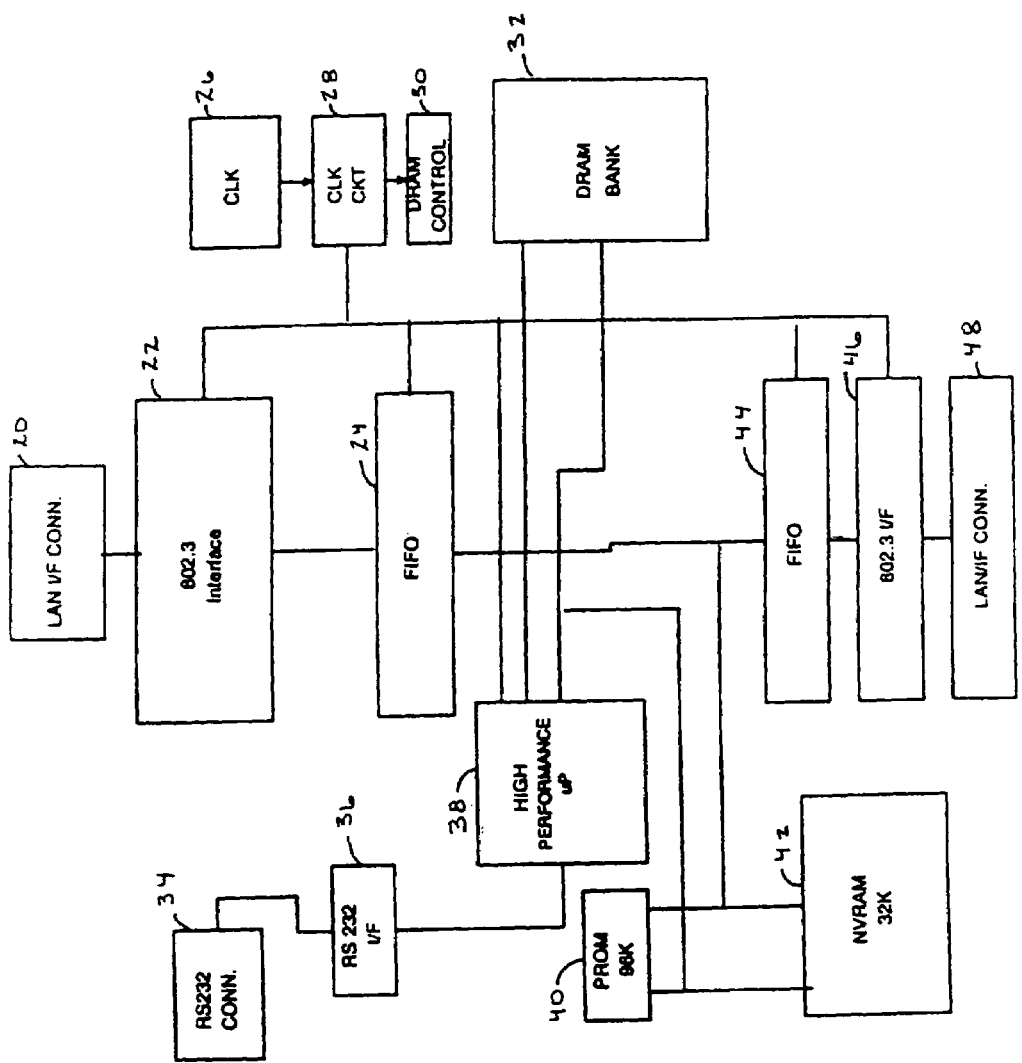
FIG. 2 is a block diagram of a packet filter processor in accordance with one embodiment of the invention.

FIG. 2 is a block diagram of a packet filter processor in accordance with one embodiment of the invention. As shown in FIG. 2, LAN interface (I/F) connector 20 is coupled to network interface card 22. Connector 20 and card 22 are used to interface with LAN 112, and to accept packets originating from network 102 or workstation 108. Connector 48 and card 46 are used to interface with additional networks or network devices if a packet filter processor is placed in an internetworking device such as a router, bridge or gateway. Connectors 20 and 48, as well as cards 22 and 46, operate in accordance with principles well-known in the art.

Further, cards 22 and 46 are designed to adhere to the Institute of Electrical and Electronics Engineers (IEEE) standard titled "Carrier Sense Multiple Access with Collision Detection" (CSMA/CD) Access Method and Physical Layer Specifications, American National Standard ANSI/IEEE Standard 802.3, 1985 ("IEEE 802.3 standard"). The IEEE 802.3 standard defines a technique referred to as CSMA/CD, which is appropriate for a network having a bus/tree topology. It can be appreciated, however, that network interfaces designed to work with other medium access techniques or standards could be used for packet filter processor 110, and still fall within the scope of the invention.

Cards 22 and 44 are connected to one another, and also to First In First Out (FIFO) buffers 24 and 44, respectively. FIFO buffers 24 and 44 are used to store incoming or outgoing packets in memory until each packet can be compared and sent to appropriate network.

Packet filter processor 110 also includes several types of high-speed memory. By way of example, this embodiment of the invention includes a 96 kilobyte (K) Programmable Read Only Memory (PROM) 40, a 32K Non-Volatile Random Access Memory (NVRAM) 42, and a Dynamic Random Access Memory (DRAM) bank 32. There is also a DRAM control 30 for DRAM bank 32.

Each type of memory is used to store data for packet filter processor 110. For example, PROM 40 is used to store an operating system 39 (not shown) for packet filter processor 110. NVRAM 42 is used to store user defined parameters 45, and operating system parameters 43 used by the operating system stored in PROM 40. DRAM bank 32 is used to store a common host identifier list 33 of common host identifiers. DRAM bank 32 also stores a IPSEC module and its associated databases, such as the Security Policy Database (SPD), the Security Association Database (SAD), and a policy configuration file. The SPD specifies the policies that determine the disposition of all IP traffic inbound or outbound from a host, security gateway, and so forth. The SAD contains parameters that are associated with each active SA. The policy configuration file is designed using a particular policy language, and represents the policy or rules by which packets are processed by packet filter processor 110. Alternatively, the IPSEC module and its associated databases (SAD and SPD) and policy configuration file could be stored in memory within the network device where packet filter processor 110 is implemented (e.g., a PC's RAM).

The heart of packet filter processor 38 is a dedicated high performance microprocessor 38. Any microprocessor capable of operating at the speeds necessary to implement of the functions of the packet filter processor is appropriate. Examples of processors suitable to practice the invention includes the INTEL family of processors, such as the Pentium®, Pentium® Pro, and Pentium® II microprocessors.

Packet filter processor 110 also includes a connector 34 and interface 36, both of which are attached to processor 38. Connector 34 and interface 36 both adhere to Electronic Industries Association (EIA) Standard RS-232-C titled "Interface Between Data Terminal Equipment and Data Communication Equipment Employing Serial Binary Data Interexchange," October, 1969. Finally, packet filter processor 110 includes a clock 26 and clock counter 28 to control the timing of packet filter processor 110.

Packet filter processor 110 operates in accordance with operating system 39, the IPSEC module and the policy configuration file, each of which is comprised of a set of computer program instructions which are stored in PROM 40. Since a list of common host identifiers can include a large number of identifiers, e.g., ranging from hundreds to several thousand, the processing time required to compare an identifier of an incoming packet with a list of several thousand identifiers is enormous, and significantly degrades the performance of many conventional packet filters. By way of contrast, packet filter processor 110 combines the elements of a high-speed microprocessor, a common host identifier list stored in high-speed memory, and a dedicated proprietary operating system, to ensure that data packets can be filtered at a high-rate of speed.

Operating system 39 is designed to control the operation of the processor in conjunction with the IPSEC module. More particularly, operating system 39 and the IPSEC module are designed such that the processor is directed to look at the common host identifier of each received data packet to determine if the common host identifier matches one of the stored common host identifiers, and if there is a match, to either discard or forward the data packet depending on the rules set forth in the policy configuration file. Moreover, it verifies that the packet is successfully authenticated by a key belonging to an identified host. This let's the filter processor know from which host the packet was sent. Since operating system 39 and processor 38 are dedicated to one task, packet filter processor 110 can perform the filtering process very quickly and efficiently. The operation of operating system 39, and of packet filter processor 110 in general, will be described in more detail with reference to FIG. 3.

Another reason packet filter processor 110 is so efficient is that packet filter processor 110 is implemented between the physical layer and data link layer of the International Standardization Organization (ISO) protocol stack. The significance of this implementation can be better appreciated in view of some background information of network architectures in general.

A network architecture defines protocols, message formats, and standards to which products must conform in order to connect properly with the network. Architectures are developed by standards organizations, common carriers, and a computer and network vendors. Network architectures use a layered approach, whereby functions are organized into groups and assigned to specific functional layers in the architecture. Network architectures define the interfaces between layers in a given network node and within the same layer in two different nodes.

The ISO model provides a generalized model of system interconnection. It encompasses seven layers: application, presentation, session, transport, network, data link, and physical. A brief summary for each layer is given as follows:

1. Physical Layer—The physical layer is responsible for the transmission of bit stream across a particular physical transmission medium. It involves a connection between two machines that allows electrical signals to be exchanged between them.

2. Data Link Layer—The data link layer is responsible for providing reliable data transmission from one node to another and for shielding higher layers form any concerns about the physical transmission medium. It is concerned with the error free transmission of frames of data.

3. Network Layer—The network layer is concerned with routing data from one network node to another. It is responsible for establishing, maintaining, and terminating the network connection between two users and for transferring data along that connection.

4. Transport Layer—The transport layer is responsible for providing data transfer between two users at an agreed on level of quality.

5. Session Layer—The session layer focuses on providing services used to organize and synchronize the dialog that takes place between users and to manage data exchange.

6. Presentation Layer—The presentation layer is responsible for the presentation of information in a way that is meaningful to the network users, e.g., character code translation, data conversion, or data compression or expansion.

7. Application Layer—The application layer provides a means for application processes to access the system interconnection facilities in order to exchange information.

Packet filter processor 110 is implemented between the physical layer and data link layers described above, in order to increase the speed at which packets are filtered. The physical layer is responsible for data encoding and decoding. Data encoding refers to translating the bits being transmitted into the proper electrical signals to be sent across the transmission medium. Data decoding translates the electrical signals received over the transmission medium into the bit stream those signals represent. The data link layer is concerned with data encapsulation/decapsulation and media access management. These functions, however, are not necessary for identifying the common host identifier of the packet. For example, data decapsulation is the function of recognizing the destination address, determining if it matches the receiving station's address, performing error checking, and removing control information that was added by the data encapsulation function in the sending station. Therefore, by implementing packet filter processor 110 between the physical layer and data link layer, processor 110 can maximize the speed at which it filters each packet.

Although packet filter processor 110 is implemented between the physical layer and data link layer in this embodiment of the invention, it can be appreciated that packet filter processor can be implemented at or between other layers as well. For example, it is possible to implement packet filter processor 110 between the data link layer and network layer, or at the network layer itself, and still fall within the scope of the invention.

Figure 3:
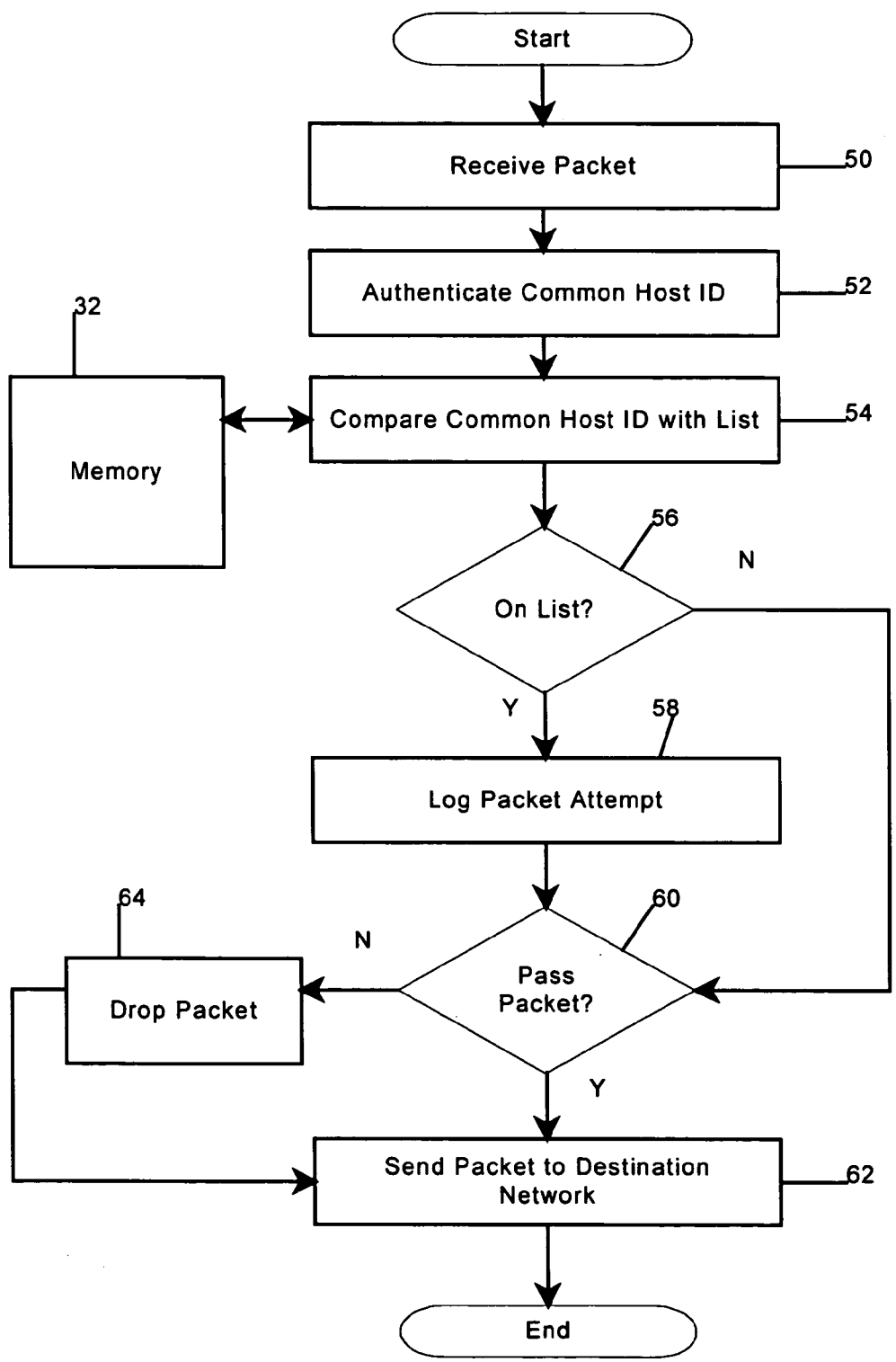
FIG. 3 is a block flow diagram of steps for filtering data packets in accordance with one embodiment of the invention.

FIG. 3 illustrates a block flow diagram of steps for filtering data packets in accordance with one embodiment of the invention. The description with respect to FIG. 3 will assume that a packet is originating from network 102 and has an intended destination address of workstation 108. It can be appreciated, however, that the operation of packet filter processor 110 is identical when the packet originates from workstation 108 and has an intended destination address within network 102 or another workstation attached to network 102. Furthermore, each packet is assumed to be modified to include a cryptographically-verifiable common host identifier as part of the AH in accordance with IPSEC. In one embodiment of the invention, each packet is further encrypted in its entirety to add another layer of protection.

Packet filter processor 110 receives a packet at step 50. Connector 20 receives the packet and passes the packet to interface card 22 which is designed to convert the electrical impulses received over the physical transmission media into packets conforming to the standards set forth in IEEE 802.3. The packet is stored in FIFO 24. Processor 38 authenticates the common host identifier for the packet in accordance with IPSEC standards at step 52. A security association is set up for each source device using a certificate and stored in the SAD. The SA includes the common host identifier. When a packet is received, the AH header has a pointer to a SA stored in the SAD. The SA has (among other things) a cryptographic key. The key is used to authenticate the packet by means of a cryptographic function as set forth in IPSEC. If the check succeeds, the common host identifier is taken from the SAD as indicated by the SA. The common host identifier could be a port number, a source IP address, or some other designator. If the entire packet is encrypted, the entire packet is decrypted and the above process is performed for the AH.

In one embodiment of the invention, encryption/decryption for key exchange and certificate verification to set up a SA is performed using a public key cryptography algorithm, such as the algorithm originally developed by Ronald Rivest, Adi Shamir and Leonard Adleman (RSA) in 1978 or any of its updates. In public key cryptography, two keys are used which are typically referred to as a "key pair." The first key of the key pair is known as the public key and is used to encrypt messages. The second key of the key pair is known as the corresponding private key and is used for decryption. Given only the public key, it is effectively impossible to find the corresponding private key, and hence impossible to read encrypted messages. Other encryption techniques are used for encryption and authentication of packets, such as DES, triple DES for encryption, and HMAC.

Once the common host identifier has been authenticated at step 52, the common host identifier is compared to list 33, which is stored in DRAM bank 32, at step 54. List 33 is stored in DRAM bank 32 in order to increase the speed at which data from the list could be retrieved by processor 38, as compared to, e.g., when data is stored on some other computer readable medium such as a hard drive or floppy disk. Step 56 comprises a test to determine whether there is a match at step 54. If there is a match at step 54, then packet filter processor 58 records the attempt at step 58 before passing control to step 60. If there is not a match at step 54, then control is directly passed to step 60.

Packet filter processor 110 determines whether the packet should be passed at step 60. The decision whether to pass the packet or not is dependent upon the rules set forth in the policy configuration file for processor 110. For example, packet filter processor 110 could have a policy rule set indicating that processor 110 should operate in a restrictive mode or a permissive mode. Restrictive mode refers to a condition where a select number of packets are to be passed, and all others blocked. Permissive mode is where all packets are to be passed except for a select few that require blocking. Thus, in permissive mode, the packet is passed if the common host identifier for a packet does not match an identifier on list 33. If there is a match, packet filter processor 110 drops the packet. In restrictive mode, the packet is passed if the common host identifier does match an identifier from list 33, and is dropped otherwise. In addition, a rule could be implemented that if a common host identifier does not match an identifier from list 33, that processor 110 seeks authority from another device regarding treatment of the packet.

At step 60, packet filter processor 110 determines whether the packet should be passed depending on whether processor 110 has been set to permissive mode or restrictive mode. If processor 110 has been set to restrictive mode, and there is a match at step 56, then the packet is passed at step 62 to the destination network which in this embodiment of the invention is network 16 or terminal 18. If processor 110 has been set to restrictive mode, and there is not a match at step 56, then the packet is dropped at step 64. Conversely, if processor 110 has been set to permissive mode, and there is a match at step 56, then the packet is dropped at step 64. If processor 110 has been set to permissive mode, and there is not a match at step 56, then the packet is passed to the destination network at step 62. In this embodiment of the invention, a default condition is that no feedback is given to the system sending the packets for security reasons if a packet is dropped at step 64. It can be appreciated, however, that this default condition can be changed and still fall within the scope of the invention.

In accordance with the system administration aspects of the invention, a service provider administers a database of common host identifier lists. Each list may contain the common host identifiers of particular types of Internet sites. The service provider periodically updates list 33 stored in DRAM bank 32 of packet filter processor 110 in a secure manner using cryptography. In this way, end users can be assured that the common host identifier lists stored in their filtering processor are up to date and that the data has not been tampered with by intercepting users.

List 33 can be updated in at least two ways. First, list 33 could be updated by connecting Data Terminal Equipment (DTE) such as an asynchronous (ASCII) terminal (or personal computer emulating an asynchronous terminal) to RS-232 connector 34 of packet filter processor 110. This method would enhance security when updating list 33. Alternatively, a network connection is formed with a central administrative site equipped with a list server 70, preferably through an Internet Service Provider (ISP) using a direct network connection or via RS-232 connector 34. List 33 is then updated from the central administrative site, either by a request by the list server 70 of the administrative site, or on the request of packet filter processor 110.

Although a full implementation of distributed firewalls is the most secure and the most flexible, hybrid implementations can exist. That is, one can combine the techniques described here with traditional firewalls, achieving adequate functionality at lower cost, especially until IPSEC support becomes ubiquitous. In a hybrid implementation, some hosts are behind a traditional firewall, while other hosts live on the outside. An IPSEC gateway at the central site provides connectivity to the outside machines. This configuration is common at companies with a major central site and some number of telecommuters. As in ordinary virtual private networks (VPNs), remote hosts have full access to the inside, by virtue of the IPSEC tunnel. Traffic from inside machines to the remote nodes is similarly protected. What is distinct is that traffic from remote nodes to the rest of the Internet is governed by the central site's security policy. That is, the firewall administrator distributes a security policy to the remote nodes, as described above. Ideally, this same policy statement is used to control the traditional firewall, thus ensuring a consistent security policy.

Another variety of hybrid implementation ignores IPSEC entirely. In this situation, address-dependent policy rules are distributed to, and enforced by, every individual host within a site. Many newer systems support such functionality in the kernel. While address-based authentication is quite weak, if a simple router prevents address-spoofing from the outside the security should comparable to that of traditional firewalls. Here, we use system management techniques to ensure consistent policy. We also rely on topology, thus forfeiting the ability to protect remote hosts. However, we still eliminate the single chokepoint and point of failure. A final hybrid scheme combines the two previous hybrid schemes. Again, a simple router prevents address-spoofing by outside machines that talk to inside nodes. IPSEC is used to tunnel traffic from inside notes to remote nodes. On these systems, the IPSEC module provides anti-spoofing protection. Finally, all protected machines, whether local or remote, receive and enforce an address-based firewall policy.

With the proper sort of routing, triangle routing can be used for a few protocols, while distributed firewall techniques are used for most. Suppose, for example, that some protocol requires an application-level proxy for proper firewalling. Packets for that protocol can be routed through an IPSEC-protected tunnel to the inside of the firewall. From there, they can be forwarded to the Internet, but only after proper processing by the firewall. A policy configuration file to implement such a scheme is as follows:

```
{Start}
    inside_net=x509{name="*.example.com",
        ver>19990315};
    mail_gw=x509{name="mailgw.example.com"};
    time_server=IPv4{10.1.2.3};
    allow smtp(*, mail_gw);
    allow smtp(mail_gw, inside_net);
    allow ntp(time_server,inside_net);
    allow*(inside_net,*);
{End}
```

Although various embodiments are specifically illustrated and described herein, it will be appreciated that modifications and variations of the present invention are covered by the above teachings and within the purview of the appended claims without departing from the spirit and intended scope of the invention. In particular, one can use other key exchange techniques that don't use certificates, but instead use other host identifiers. For another example, although a public key cryptography algorithm was used in the embodiments of the invention, it can be appreciated that any number of encryption algorithms can be used to secure an address list and still fall within the scope of the invention. In another example, although specific equipment was illustrated in FIG. 2 for a particular type of medium access technique, it can be appreciated that the packet filter processor shown in FIG. 2 can be modified to include equipment for any type of medium access technique, such as IEEE 802.2, 802.4, 802.5, 802.12 and so forth, and still fall within the scope of the invention.

What is claimed is:

1. A method executed within a processing unit for filtering packets, comprising the steps of:
   receiving a packet that includes an encrypted identifier and an unencrypted remainder of said packet, for verifying identity of a first device that sent said packet;
   authenticating said identifier;
   determining whether to forward said packet to a second device based on result of said authenticating, and a policy relative to said source device; and
   forwarding said packet to said second device in accordance with said determination.

2. The method of claim 1, wherein said step of determining comprises:
   comparing authenticated identifier yielded by said step of authenticating to a list of identifiers;
   retrieving at least one policy rule relative to said authenticated identifier;
   determining whether to send said packet to said second device in accordance with said policy rule.

3. The method of claim 1, wherein said authenticating is performed in accordance with IPSEC standards.

4. The method of claim 1, wherein said authenticating comprises:
   retrieving a pointer to a security association from an authentication header from said packet;
   retrieving a key associated with said security association; and
   determining whether said packet is authentic using said key.

5. The method of claim 4, further comprising the step of sending a first message to a third device indicating said identifier is not authentic when said step of authenticating so determines.

6. The method of claim 4 wherein said authentication header is an IPSEC authentication header.

7. The method of claim 1, wherein said packet is, in addition, encrypted, and said method further comprises decrypting said packet prior to authenticating.

8. The method of claim 7, wherein said packet is encrypted and decrypted using one of group of cryptographic techniques comprising DES, triple DES, HMAC and RSA.

9. The method of claim 1, wherein said policy rule is stored in a policy configuration file at said processing unit.

10. A machine-readable memory whose contents cause a computer system to perform packet filtering, by performing the steps of:
    receiving a packet that includes an encrypted identifier for verifying identity of a first device that sent said packet, while remainder of said packet unencrypted;
    authenticating said identifier;
    determining whether to forward said packet to a second device based on result of said authenticating, and a policy relative to said source device; and
    forwarding said packet to said second device in accordance with said determination.

11. The machine-readable memory of claim 10, wherein said determining comprises:
    comparing authenticated identifier yielded by said step of authenticating to a list of identifiers;
    retrieving at least one policy rule relative to said authenticated identifier;
    determining whether to send said packet to said second device in accordance with said comparison and said policy rule.

12. The machine-readable memory of claim 10, wherein said authenticating is performed in accordance with IPSEC standards.

13. The machine-readable memory of claim 10, wherein said authenticating comprises:
    retrieving a pointer to a security association from an authentication header from said packet;
    retrieving a key associated with said security association; and determining whether said packet is authentic using said key.

14. The machine-readable memory of claim 13, further comprising the step of sending a first message to a third device indicating said identifier is not authentic when said step of authenticating so determines.

15. The machine-readable memory of claim 13 wherein said authentication header is an IPSEC authentication header.

16. The machine-readable memory of claim 10, wherein said packet is, in addition, encrypted, and said method further comprises decrypting said packet prior to authenticating.

17. The machine-readable memory of claim 16, wherein said packet is encrypted and decrypted using one of group of cryptographic techniques comprising DES, triple DES, HMAC and RSA.

18. The machine-readable memory of claim 10, wherein said policy rule is stored in a policy configuration file at said processing unit.

19. A packet filter for a distributed firewall, comprising:
    an input means coupled to said first network for receiving a data packet from a first device, said data packet having an encrypted common host identifier for verifying identity of a first device that sent said packet via a decryption process, while remainder of said packet unencrypted;
    a first buffer coupled to said input means for storing said received packet;

a first memory segment containing a list of common host identifiers and at least one policy rule;

a second memory segment for storing a program for decrypting said common host identifier, authenticating said common host identifier, and determining whether to send said packet to a second device based on said list and said policy rule;

a processor coupled to said first buffer, said first memory segment and said second memory segment for executing said program; and an output means coupled to said first buffer for forwarding said compared data packet to said second device based on said comparison.

20. The apparatus of claim 19, further comprising a second buffer for storing said compared data packet prior to forwarding said compared data packet to the second device.

21. The method of claim 1 where said identifier relates to hardware.

22. The method of claim 1 where said identifier relates to an IP source address.

23. The method of claim 1 where said receiving a packet is unsolicited.

* * * * *